Patented July 16, 1929.

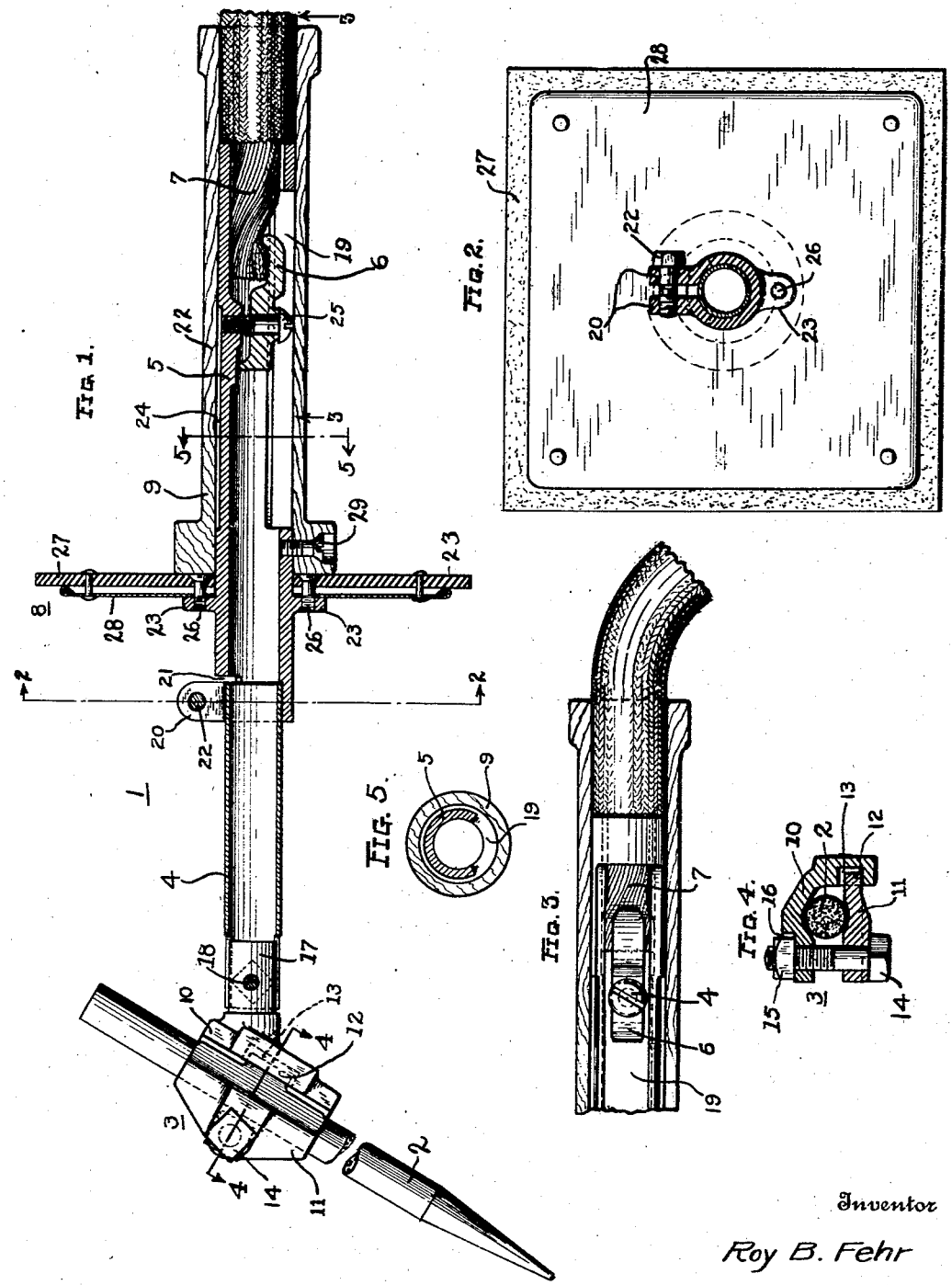

1,721,296

UNITED STATES PATENT OFFICE.

ROY B. FEHR, OF EAST CLEVELAND, OHIO, ASSIGNOR TO UNA WELDING & BONDING COMPANY, OF CLEVELAND, OHIO, A CORPORATION OF DELAWARE.

WELDING ELECTRODE HOLDER.

Application filed December 1, 1925. Serial No. 72,477.

This invention relates to an improved electrode holder, particularly adapted for use in electric arc welding.

It is desirable that electrode holders for electric arc welding be constructed in a simple, economical and rugged manner. In such an electrode holder, furthermore, the handle grip should remain substantially cool during welding. In arc welding, and more particularly with the carbon arc process, considerable heat is transmitted to the portion of the electrode holder in direct contact with the electrode, thereby causing such portion to deteriorate much faster than the rest of the holder. Such portion should preferably be replaceable in order to prolong the usefulness and life of the electrode holder as a whole.

An object of my invention is to provide an electrode holder for use in electric arc welding, the portion of said electrode holder which is subject to the greatest deterioration being replaceable in order to increase the life of the holder.

Another object of the invention is to provide an electrode holder in which the handle grip will remain cool during continuous operation of the holder.

A further object of this invention is to provide an electrode holder adapted to remain in a definite position when disposed on a substantially horizontal surface, to thereby avoid the possibility of breaking a fragile electrode, or of contacting a heated electrode with combustible material.

Other objects of the invention will be apparent to those skilled in the art from the description of it hereinafter given.

In the drawings, Figure 1 is a sectional view, partly in elevation, of my improved electrode holder;

Fig. 2 is a vertical section on line 2—2 of Fig. 1, showing the shield in elevation;

Fig. 3 is a view on line 3—3 of Fig. 1, the handle grip being in section, showing the means for electrically connecting a welding cable or lead to the holder;

Fig. 4 is a section on line 4—4 of Fig. 1, showing the cross sectional shape of the clamping head; and Fig. 5 is a section on line 5—5 of Fig. 1.

The electrode holder disclosed in this application and designated generally at 1 is particularly adapted to support or hold a carbon or graphite electrode 2 for use in the carbon arc process of electric arc welding. The holder 1 may, of course, be used, if desired, to support a metal or other electrode in substantially the same manner. The electrode holder 1 as shown consists broadly of a renewable electrode clamping head 3, which is removably attached to one end of a connecting portion 4. The other end of said portion 4 is connected to a body portion 5. Clamp 6 is associated with body 5 to maintain a welding cable or lead 7 in electrical contact with the body 5. Supported by the body 5 is a protective shield member 8 and an electrical and heat insulating handle grip 9.

The clamping head 3 is shown as comprising two cooperating members 10 and 11 of rugged construction. The member 11 is provided with an extension 12 adapted to pivot within the socket 13 so that the members 10 and 11 may be adjustably moved with respect to one another to rigidly support electrodes 2 of various diameters. The members 10 and 11 are maintained in desired relationship with each other about an electrode by a suitable fastening means such as bolt 14 and nut 15. The nut 15 may be disposed in a groove 16 whereby adjustment may be secured by turning the head of the bolt 14. The clamping head 3 is shown as removably secured to the connecting portion 4 by means of a projecting portion 17 disposed within the portion 4 and secured thereto by means 18, such as a bolt and nut. The clamping head 3 is strongly subjected to the intense heat of the carbon arc during the welding operation and hence deteriorates much faster than the rest of the holder 1. For this reason the clamping head is preferably renewable. The head 3 may advantageously be made of inexpensive material such as cast iron, and the dimensions thereof are preferably sufficient that the head will not deteriorate too rapidly.

Connecting portion 4 may be composed of metal tubing, preferably of steel or other metal of relatively low heat conductivity as compared with copper. The tubing 4 is shown as split longitudinally at the end adjacent to the portion 17 so that the clamping head 4 may be rigidly secured thereto. The other end of the portion 4 is adapted to be secured to the body portion 5. The portion 4 is electrically conductive, and is preferably hollow to reduce the mass thereof. It is desirable, however, that the said portion 4 be a relatively poor heat conductor in order that it may not transfer an appreciable amount of heat from the electrode 2 and clamping head 3 to the body portion 5 and handle grip 9. Steel tubing has been found very satisfactory for this purpose, particularly on account of its lightness and mechanical strength.

The body portion 5 is of tubular construction, partly open to form a longitudinal slot 19, as shown in Figs. 1, 3 and 5. At the end of the body portion 5 adjacent to the connector 4 the body 5 is longitudinally split and provided with apertured ears 20, and transversely split at 21. The connector 4 is adapted to extend into this end of the body 5 and may be secured thereto by suitable fastening means 22 in the ears 20. Apertured lugs 23 are provided on the body portion to which may be secured the shield 8. The external diameter of the body 5 is somewhat reduced at 24 in order to reduce the area of contact of the body 5 with the handle grip 9 and hence to reduce the amount of heat transferred to the grip 9. The cable 7 extends through the end of the body 5 and is maintained in electrical contact therewith by means of clamp 6 and screw 25. If the handle grip 9 be slipped off the body 5 and onto the cable 7, it will be seen that the screw 25 may be actuated as by a screw driver inserted through the longitudinal slot 19. The body 5 is made hollow for lightness and economy and is preferably of a metal which is relatively ductile and resistant to shock in its cast state, such as copper or brass.

The protective shield 8, which is shown as apertured at its center, surrounds the body 5 and may be connected thereto by means of screws 26 cooperating with the lugs 23. The shield 8 is shown as comprising an insulating member 27, which may be of a suitable material, such as fiber, and which is preferably polygonal in shape. Connected in front of member 27 and in spaced relation thereto is a sheet metal member 28 for the purpose of adding mechanical strength and for protecting the fiber 27 from the intense heat of the arc. The shield 8 is preferably of polygonal shape so that the holder 1 may be disposed on the ground or other surface in a definite position and not roll and thereby break the electrode or cause a hot electrode to contact with a combustible material or surface.

The handle grip 9, which may be fastened to the body 5 by a screw 29, is preferably cylindrical in shape and surrounds the body 5 and the end of the cable 7. The grip 9 may be composed of any suitable insulating material such as wood or fiber.

The connector 4 and the body 5 might, under certain circumstances, be integrally formed of an electrically conductive but poor heat conducting material. I have found, however, that the construction as shown is economical and relatively strong. It will be noted that I have provided a welding handle in which the electric current may be transmitted from the welding cable to the electrode and vice versa, but in which relatively little heat is conducted from the arc to the handle grip, thereby making it possible for the operator to continue a welding operation without interruption due to overheating of the holder. The shield further protects the operator's hands to some degree from the heat and destructive rays of the arc.

It may be noted that the relative sizes of the component parts of the electrode holder may be varied according to the particular welding purposes for which the holder may be used. Thus, for example, if the holder is to be employed for cutting purposes with high currents, it may be desirable to increase the relative size of the clamping head and to adapt the head to support electrodes of relatively larger size, thus increasing the life of the electrode and reducing deterioration of the clamping head.

I have furthermore provided an electrode holder in which the part most subject to deterioration, namely, the clamping head, is readily replaceable, thereby greatly increasing the life of the holder.

It may further be noted that when the welding cable 7 is connected to the holder, the weight of such cable substantially counterbalances the weight of the electrode and of the holder forwardly of the grip so that the center of gravity of the holder is substantially at the handle grip, thereby greatly decreasing fatigue on the part of the operator.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. In an electrode holder for use in electric arc welding, a protective shield comprising an electrical and heat insulating plate and a metallic plate disposed in front of and spaced from but connected with said first named plate, the said shield being polygonal in external shape to prevent said holder from rolling when the said holder is disposed on a substantially flat surface in a definite position.

2. An electrode holder for use in electric arc welding comprising, in combination, a body portion, clamping means arranged to secure a cable to said body portion, a tubular, electrically non-conductive handle disposed over the rearward part of said body portion and removably secured thereto, a metal connecting portion removably secured to the forward end of said body portion and extending forwardly thereof, whereby said connecting portion may be readily removed and replaced, and a clamping head removably secured to the forward end of said connecting portion and extending forwardly thereof, said clamping head being arranged to grip and maintain a welding electrode in welding position.

3. An electrode holder for use in electric arc welding comprising, in combination, a tubular body portion arranged to permit a cable to extend thereinto from its rearward end, clamping means arranged to secure said cable in electrical contact with said body portion, a tubular electrically non-conductive handle disposed over the rearward part of said body portion, removably secured thereto, and arranged to extend rearwardly beyond the end of said body portion over said cable, a tubular connecting portion removably secured to the forward end of said body portion and extending forwardly thereof, whereby said connecting portion may be readily removed and replaced, and a clamping head removably secured to the forward end of said connecting portion and extending forwardly thereof, said clamping head being arranged to grip and maintain a welding electrode in welding position.

4. An electrode holder for use in electric arc welding comprising, in combination, a slotted tubular body portion arranged to permit a cable to extend thereinto from its rearward end, a fixed transversely disposed shield secured to said body portion adjacent but rearwardly of the forward end thereof, clamping means accessible through said slot to secure said cable in electrical contact with the interior of said body portion, a tubular electrically non-conductive handle disposed over said body portion rearwardly of said shield removably secured to said body portion, and arranged to extend rearwardly beyond the end of said body portion over said cable, said handle being slidable rearwardly over said cable to permit access to said clamping means, a tubular connecting portion removably secured to the forward end of said body portion and extending forwardly thereof, whereby said connecting portion may be readily removed and replaced, and a clamping head removably secured to the forward end of said connecting portion, said clamping head being arranged to grip and maintain a welding electrode in welding position.

In testimony whereof I affix my signature.

ROY B. FEHR.